US 9,964,681 B2

(12) United States Patent
Liu et al.

(10) Patent No.: US 9,964,681 B2
(45) Date of Patent: May 8, 2018

(54) HIGH-DIFFUSION-COEFFICIENT AND HIGH-BRIGHTNESS LIGHT SOURCE GENERATION DEVICE

(71) Applicant: THE NATIONAL INSTITUTE OF METROLOGY(CHINA), Beijing (CN)

(72) Inventors: Zilong Liu, Beijing (CN); Yu Wang, Beijing (CN); Wenli Liu, Beijing (CN); Rui Chen, Beijing (CN)

(73) Assignee: THE NATIONAL INSTITUTE OF METROLOGY(CHINA), Beijing (CN)

( * ) Notice: Subject to any disclaimer, the term of this patent is extended or adjusted under 35 U.S.C. 154(b) by 0 days. days.

(21) Appl. No.: 15/524,564

(22) PCT Filed: Feb. 10, 2015

(86) PCT No.: PCT/CN2015/072664
§ 371 (c)(1),
(2) Date: May 4, 2017

(87) PCT Pub. No.: WO2016/086541
PCT Pub. Date: Jun. 9, 2016

(65) Prior Publication Data
US 2017/0322360 A1 Nov. 9, 2017

(30) Foreign Application Priority Data
Dec. 2, 2014 (CN) .......................... 2014 1 0724738

(51) Int. Cl.
*F21V 8/00* (2006.01)
*F21V 29/85* (2015.01)
(Continued)

(52) U.S. Cl.
CPC .......... *G02B 6/0008* (2013.01); *F21V 3/0418* (2013.01); *F21V 7/08* (2013.01); *F21V 29/86* (2015.01); *F21Y 2111/00* (2013.01)

(58) Field of Classification Search
CPC ... G02B 6/0008; F21V 3/0427; F21V 3/0418; F21V 29/86; F21V 7/08; F21Y 2111/00
See application file for complete search history.

(56) References Cited

U.S. PATENT DOCUMENTS 3,114,283 A * 12/1963 Gruner ...................... G01J 1/04
250/227.28
3,455,637 A * 7/1969 Howard ................. G01N 21/86
250/227.28
4,887,190 A 12/1989 Sadamune et al.

FOREIGN PATENT DOCUMENTS

CN 201149524 Y 11/2008
CN 102818624 A 12/2012
(Continued)

OTHER PUBLICATIONS

International Search Report issued in PCT/CN2015/072664 dated Aug. 21, 2015.

*Primary Examiner* — Mary Ellen Bowman
(74) *Attorney, Agent, or Firm* — Keller Jolley Preece

(57) ABSTRACT

A high-diffusion-coefficient and high-brightness light source generation device comprising: a light source module, an optical fiber bundle and an optical fiber hemisphere emitter, wherein the light source module provides the optical fiber bundle with a plane light source having the same size as an end surface of an incident end thereof, the incident end receives light emitted from the light source module, exit ends transmit the light to the optical fiber hemisphere emitter, the exit ends of the optical fiber bundle arranged on a hemispherical wall of the optical fiber hemisphere emitter in an equal solid angle manner, an end surface of each optical fiber exit end located on the same surface as the inner wall of a hemisphere, a bottom plate arranged above an (Continued)

opening of the optical fiber hemisphere emitter, and an opal glass window arranged at the circle center position of the bottom plate.

10 Claims, 2 Drawing Sheets

(51) Int. Cl.
*F21V 7/08* (2006.01)
*F21V 3/04* (2018.01)
*F21Y 111/00* (2016.01)

(56) References Cited

FOREIGN PATENT DOCUMENTS

| CN | 203720435 U | | 7/2014 |
|----|-------------|---|--------|
| JP | 5273042 A | | 10/1993 |
| JP | 10153422 A | | 6/1998 |
| JP | 2000093389 A | * | 4/2000 |

* cited by examiner

HIGH-DIFFUSION-COEFFICIENT AND HIGH-BRIGHTNESS LIGHT SOURCE GENERATION DEVICE

CROSS-REFERENCE TO RELATED APPLICATIONS

This application is a national phase entry under 35 U.S.C. § 371 of International Application No. PCT/CN2015/072664, filed Feb. 10, 2015, which claims the benefit of Chinese Application No. 201410724738.2, filed Dec. 2, 2014. The entire contents of each of the foregoing patent applications are hereby incorporated by reference.

FIELD OF TECHNOLOGY

The present invention belongs to the technical field of light sources, and relates to a high-diffusion-coefficient and high-brightness light source generation device.

BACKGROUND

A high-diffusion-coefficient and high-brightness source is a light source required for many optical devices and optical measurement, for example, in the measurement of a high optical density, an ultrahigh diffusion coefficient and high brightness are required; otherwise, measured data cannot be unified. Commonly, light sources with the diffusion coefficient of over 0.9 and the brightness of over $1*10^4$ cd/m² belong to the high-diffusion-coefficient and high-brightness light source in the art. However, the higher the brightness is, the more difficult the high diffusion coefficient is to achieve, for example, the diffusion coefficient of the scheme of single opal glass designed by the National Institute of Standards and Technology (NIST) is only 0.91 and is difficult to completely meet regulations of the international standards ISO 5-2; and the scheme of opal glass and integrating sphere designed by the Physikalisch-Technische Bundesanstalt (PTB) can meet the regulations, but suffers from high luminous flux attenuation, i.e. the brightness is not high, and thus the measurement range is limited.

SUMMARY OF THE INVENTION

In order to enable a light source to reach a required value of brightness meanwhile the high diffusion coefficient requirement is met, and meet requirements of optical devices and optical measurement, the present invention provides a high-diffusion-coefficient and high-brightness light source generation device which includes:
a light source module 10, for providing the optical fiber bundle 20 with a plane light source having the same end face size as that of an incident end 203 of the optical fiber bundle 20;
the optical fiber bundle 20, with its incident end 203 receiving light emitted by the light source module 10, and exit ends 202 transmitting the light to an optical fiber hemisphere emitter 301; and
the optical fiber hemisphere emitter 301, wherein the exit ends 202 of the optical fiber bundle 20 are arranged on the hemisphere wall of the optical fiber hemisphere emitter 301 in an equal solid angle pattern, and the end face of each optical fiber exit end 202 is coplaner with an inner wall of the hemisphere; and a bottom plate 302 is disposed above an opening of the optical fiber hemisphere emitter 301, and an opal glass window 303 is disposed at the position of the circle center of the bottom plate.

Preferably, a pattern in which the optical fiber bundle 20 is arranged is provided such that geometric extending lines of all the optical fiber exit ends 202 intersect at the hemisphere center of the optical fiber hemisphere emitter 301, and the center of the opal glass window 303 is coincided with the hemisphere center.

Preferably, a number n of optical fibers in the optical fiber bundle 20 meets the following formula:

$$n = \mathrm{trunk}\left(k\frac{M}{m}\sqrt{u}\right)$$

wherein, trunk represents a round-off number, k represents a scaling factor, m represents the diameter of the optical fiber cores, M represents the diameter of the hemisphere, and u represents a spectrum attenuation coefficient of the optical fibers.

Preferably, the k is 14.5 dB⁻².

Preferably, the optical fiber bundle 20 includes 216 optical fibers, and the diameter of the optical fiber hemisphere emitter 301 is 10.2 mm.

Preferably, the optical fibers in the optical fiber bundle 20 are multimode optical fibers, and have the spectral characteristic that within a range which is not smaller than 380 nm-780 nm, the attenuation coefficient is smaller than 0.1 dB.

Preferably, the optical fiber hemisphere emitter 301 and the bottom plate 302 are formed of a rigid aluminum material.

Preferably, the inner wall of the optical fiber hemisphere emitter 301 is a light reflecting surface, which is sprayed and coated with a polyester vinyl fluoride layer, and has a spectral reflectivity of over 97% within a range which is not smaller than 380 nm-780 nm.

Preferably, the incident end 203 of the optical fiber bundle 20 is secured inside an aluminum sleeve 201, and the end face of the incident end 203 forms an incident window of the optical fiber hemisphere emitter 301.

Preferably, a heat dissipation passage is disposed on the bottom plate 302.

According to a high-diffusion-coefficient and high-brightness light source generation device provided by the present invention, light emitted by a ordinary light source is focused to the end face of the optical fiber bundle, and goes through the optical fiber hemisphere emitter so as to form a high-diffusion-coefficient and high-brightness source at the end face of the opal glass window of the optical fiber hemisphere emitter, both the diffusion coefficient and the brightness dynamic range of the high-diffusion-coefficient and high-brightness source can reach higher levels than the prior art, and when the high-diffusion-coefficient and high-brightness source is used for carrying out optical measurement, accuracy is higher and an effect is better.

Figure 1:
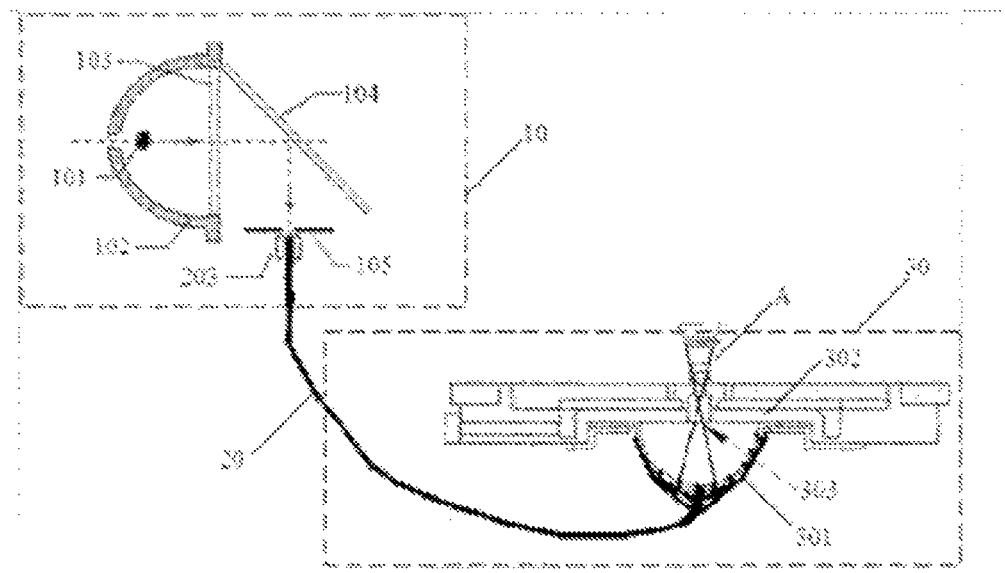
FIG. 1 is a schematic structural diagram of a high-diffusion-coefficient and high-brightness light source generation device of one embodiment of the present invention.

In the drawings: 10—Light source module; 101—Tungsten halogen lamp; 102—Off-axis ellipsoidal mirror; 103—Heat-absorbing glass; 104—Plane mirror; 105—Iris diaphragm; 20—Optical fiber bundle; 201—Sleeve; 202—Emerging end; 203—Incidence end; 30—Optical fiber hemisphere emitter module; 301—Optical fiber hemisphere emitter; 302—Bottom plate; 303—Opal glass window; and A—Light exit window.

DESCRIPTION

The specific implementation modes of the present invention will be further described in details in conjunction with the accompany drawings and embodiments. The embodiments below are used for purpose of illustrating the present invention, but not intended to limit the scope of the present invention.

With reference to FIG. 1 to FIG. 4, a high-diffusion-coefficient and high-brightness light source generation device according to the embodiment includes: a light source module 10, an optical fiber bundle 20 and an optical fiber hemisphere emitter module 30. Specifically, the light source module 10 is used for providing the optical fiber bundle 20 with a plane light source having the same end face size as that of an incident end 203 of the optical fiber bundle 20; and the incident end 203 of the optical fiber bundle 20 receives light emitted by the light source module 10, an exit ends 202 transmit the light to the optical fiber hemisphere emitter module 30, and the light is converted into a high-diffusion-coefficient and high-brightness light source through the optical fiber hemisphere emitter module 30.

With reference to FIG. 1, the light source module 10 includes a tungsten halogen lamp 101, an off-axis ellipsoidal mirror 102, a heat-absorbing glass 103, a plane mirror 104, and an iris diaphragm 105. The tungsten halogen lamp 101 is used as an original light source and is disposed centrally on the bottom of the off-axis ellipsoidal mirror 102. The heat-absorbing glass 103 is disposed at an opening of the off-axis ellipsoidal mirror 102. The plane mirror 104 is disposed at an included angle of 45 degrees with respect to the heat-absorbing glass 103, through which the direction of light horizontally irradiated to the plane mirror 104 is changed into a vertical direction. The iris diaphragm 105 is disposed at the exit position of the light; and by adjusting the iris diaphragm 105, the light is converged into the plane light source with the same end face size as that of the optical fiber bundle 20.

Figure 2:
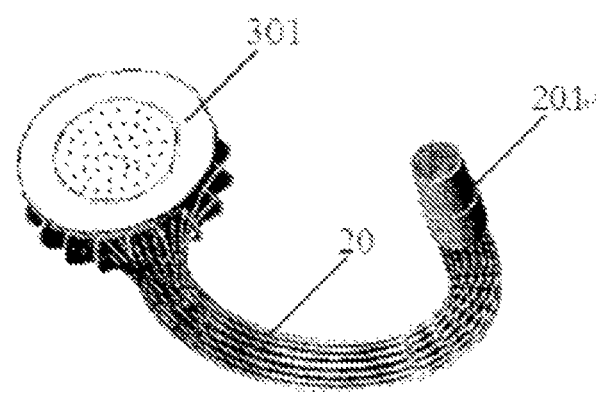
FIG. 2 is a three-dimensional mimic diagram of an optical fiber and an optical fiber hemisphere emitter shown in FIG. 1.
Figure 3:
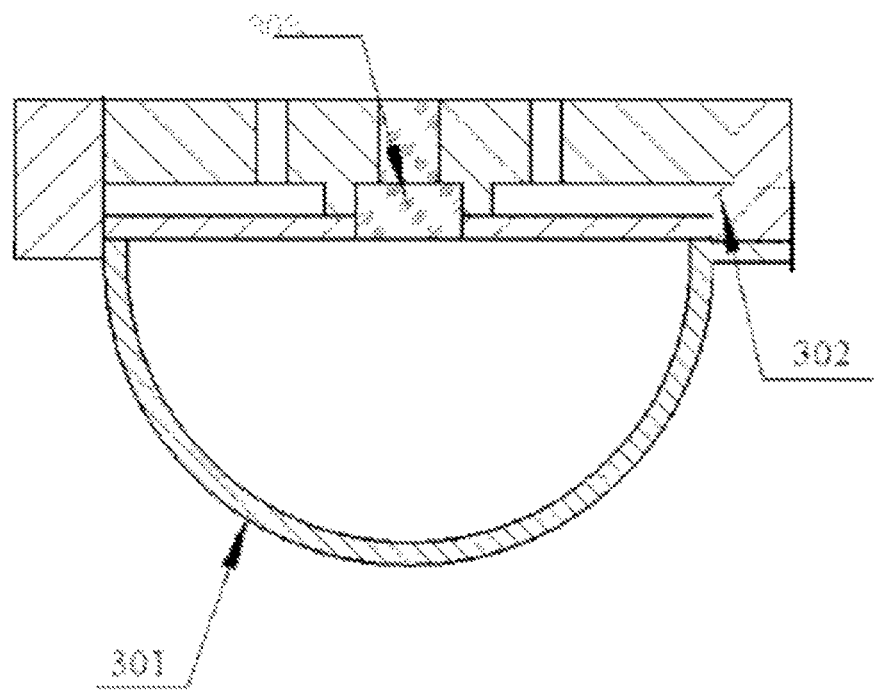
FIG. 3 is a schematic structural diagram of installation of the optical fiber hemisphere emitter shown in FIG. 1.
Figure 4:
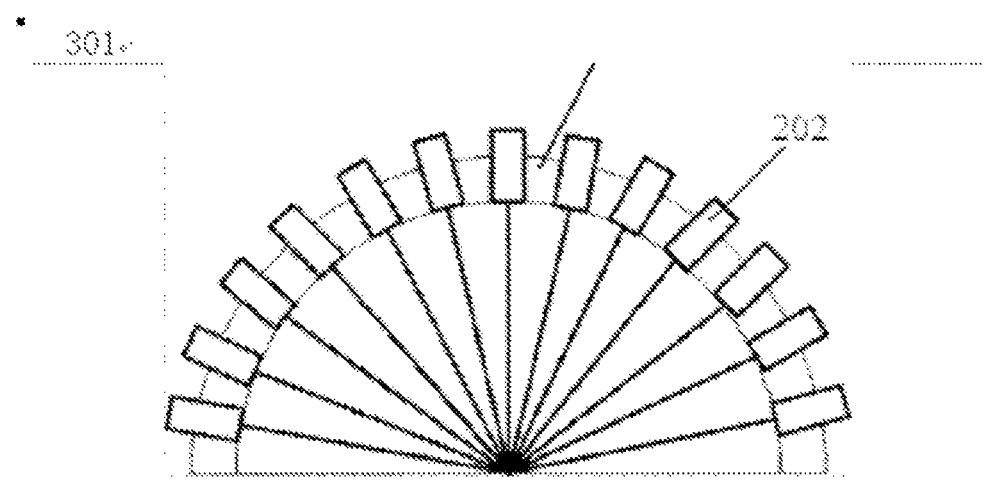
FIG. 4 is a schematic diagram of distribution of light paths in the optical fiber hemisphere emitter shown in FIG. 1.

With reference to FIG. 2 to FIG. 4, the optical fiber hemisphere emitter module 30 includes an optical fiber hemisphere emitter 301, a bottom plate 302 and an opal glass window 303. The optical fiber hemisphere emitter 301 is of a hemisphere shape, and the bottom plate 302 is disposed above the opening of the optical fiber hemisphere emitter 301. The opal glass window 303 is disposed centrally on the bottom plate. The optical fiber bundle 20 includes a plurality of optical fibers and the incident ends 203 of the optical fibers are secured inside an aluminium sleeve 201, and an incident window of the optical fiber hemisphere emitter 301 is formed on the end face of the incident end 203. The exit ends 202 of the optical fiber bundle 20 are arranged on a hemisphere wall of the optical fiber hemisphere emitter 301 in an equal solid angle pattern, and the end face of each optical fiber exit end 202 is coplanar with the hemisphere inner wall, thereby enabling the incident end 203 of the optical fiber bundle 20 to receive the light emitted by the light source module 10 and the exit ends 202 to transmit the light to the optical fiber hemisphere emitter 301.

Wherein, a pattern in which the optical fiber bundle 20 is arranged is provided such that geometric extending lines of all the optical fiber exit ends 202 intersect at the hemisphere center of the optical fiber hemisphere emitter 301, and the center of the opal glass window 303 is coincided with the hemisphere center.

In the embodiment, by means of a structure of combining the optical fiber hemisphere emitter with the opal glass window, a light beam emitted by the hemisphere wall is irradiated to the hemisphere center and is scattered by the opal glass window so as to form a near-ideal cosine radiation source.

The opal glass window refers to a light exit window A made of an opal glass material, an opal glass material is called as the opal glass material for short, which is one of types of milk glasses. The milk glass is a glass material with excellent diffuse reflection performance, in which a diffuse reflectance of a common milk glass can reach about 75%, and the opal glass is one type of milk glass which is improved in diffuse reflection performance, and a diffuse reflectance of the opal glass can reach over 85%. For this embodiment, diffuse reflection is preferred to be as high as possible, and thus, the opal glass window is used as the light exit window so as to increase a diffusion coefficient.

In this embodiment, a number n of the optical fibers in the optical fiber bundle 20 meets the following formula:

$$n = \text{trunk}\left(k\frac{M}{m}\sqrt{u}\right)$$

wherein, trunk represents a round-off number, k represents a scaling factor, m represents the diameter of the optical fiber cores, M represents the diameter of the hemisphere, u represents a spectrum attenuation coefficient of the optical fibers, and the k is 14.5 $dB^{-2}$.

The hemisphere radius of the optical fiber hemisphere emitter 301 and the number of the optical fibers in the optical fiber bundle 20 are variable and may be increased or decreased, the variations of which are dependence on parameters (such as power, spectrum and face uniformity) of the subsequent opal glass window 303 and the used ordinary light source tungsten halogen lamp 101. A judgment criteria is that increase of both parameters of the diffusion coefficient and a luminous flux of an exit face of the opal glass window is preferred; and a judgment method is to perform a multi-iteration recursion calculation by setting up a mathematical model between the diffusion coefficient and the luminous flux and multiple parameters above, according to a least square method. Preferably, when the hemisphere radius is 10.2 mm and the number of the optical fibers is 216, the result is the best, i.e. both the diffusion coefficient and the luminous flux reach the maximum values.

In this case, the optical fibers in the optical fiber bundle 20 are preferably multimode optical fibers, and have the spectral characteristic that within a range of not smaller than 380 nm-780 nm, the attenuation coefficient is smaller than 0.1 dB, so that the integral generation device has wide spectrum characteristic, meanwhile in the propagation of the optical fiber bundle, transmission loss is reduced to the greatest extent.

The optical fiber hemisphere emitter 301 and the bottom plate 302 are formed of a rigid aluminum material, where the optical fiber hemisphere emitter 301 uses the rigid aluminum material, which is convenient to glue the external spherical surface of the optical fiber hemisphere emitter 301 to optical fiber end heads in the optical fiber bundle 20, and gluing of the two materials has very high bonding stability. The bottom plate 302 and the optical fiber hemisphere emitter 301 use the same rigid aluminum material in order to share the same thermal expansion coefficient between bottom plate 302 and the optical fiber hemisphere emitter 301, thereby enabling for the stability of coupling of the optical fiber hemisphere emitter 301 and the bottom plate 302. Moreover, the position of the opal glass window 303 is determined by the bottom plate 302, therefore, an integral diffusion chamber formed of the optical fiber hemisphere emitter 301, the bottom plate 302 and the opal glass window 303 is also a structural body with stable thermal performance, and thus the optimal stability of the light from the final light exit window A is ensured.

Preferably, the inner wall of the optical fiber hemisphere emitter 301 is a light reflecting surface, which is sprayed and coated with a polyester vinyl fluoride layer, and has a spectral reflectivity of over 97% within a range of not smaller than 380 nm-780 nm. By using polyester vinyl fluoride as a coating of the inner wall of the optical fiber hemisphere emitter 301, the inner wall of the optical fiber hemisphere emitter 301 can have the spectral reflectivity of over 97% within the range of not smaller than 380 nm-780 nm, so that after repeated occurrence of diffuse reflection by the inner wall of the optical fiber hemisphere emitter 301, optical loss is reduced to the greatest degree, and light intensity of the final light exit window A is reinforced.

Moreover, a heat dissipation passage is formed on the bottom plate 302; and the heat dissipation passage commonly dissipates heat by means of air convection, and the lateral sides of the outer surface of the heat dissipation passage is commonly machined into a heat sink form.

During an actual operation process, the light emitted by the ordinary light source is focused to the end faces of the optical fiber bundle through an optical system, so as to form a high-diffusion-coefficient and high-bright source on the end face of the opal glass window of the optical fiber hemisphere emitter through the optical fiber hemisphere emitter, where the diffusion coefficient of the high-diffusion-coefficient and high-bright source can reach 0.945, the brightness dynamic range of the high-diffusion-coefficient and high-brightness source can reach an order of magnitude of $10^8$, and when the high-diffusion-coefficient and high-brightness source is used for measuring a diffuse transmission visual optical density, the measurement can be 6.0 D. Therefore, the high-diffusion-coefficient and high-brightness source is formed, both the diffusion coefficient and the brightness dynamic range of the high-diffusion-coefficient and high-brightness source can reach higher levels than the prior art, and when the high-diffusion-coefficient and high-brightness source is used for performing optical measurement, accuracy is higher and an effect is better.

Finally, it should be noted that all the embodiments above are only used for illustrating the technical scheme of the present invention, but not intended to limit the present invention; and although the present invention is illustrated in details with reference to respective embodiments above, those skilled in the art should understand that: modifications may still made to the technical solutions described in respective embodiments above, or equivalent substitutions may be made to parts or all of the technical features; and those modifications or substitutions are not intended to cause the essence of respective technical solutions to depart from the scope of the technical scheme of all the embodiments of the present invention; rather those modifications or substitutions should be covered within the scope of the claims and specification of the present invention.

INDUSTRIAL APPLICABILITY OF THE INVENTION

According to the present invention, light emitted by a ordinary light source is focused to the end face of an optical fiber bundle and goes through the optical fiber hemisphere emitter, so as to form a high-diffusion-coefficient and high-brightness source on the end face of an opal glass window of an optical fiber hemisphere emitter, both the diffusion coefficient and the brightness dynamic range of the high-diffusion-coefficient and high-brightness source can reach higher levels than the prior art, and when the high-diffusion-coefficient and high-brightness source is used for performing optical measurement, accuracy is higher and an effect is better.

What is claimed is:

1. A high-diffusion-coefficient and high-brightness light source generation device, comprising:
   a light source module for providing an optical fiber bundle with a plane light source having the same end face size as that of an incident end of an optical fiber bundle;
   the optical fiber bundle, wherein the incident end of the optical fiber bundle receives light emitted by the light source module, and exit ends of the optical fiber bundle transmit the light to an optical fiber hemisphere emitter; and
   the optical fiber hemisphere emitter, wherein the exit ends of the optical fiber bundle are arranged on the hemisphere wall of the optical fiber hemisphere emitter in an equal solid angle pattern, and the end face of each optical fiber exit end is coplanar with an inner wall of the hemisphere; and a bottom plate is disposed above an opening of the optical fiber hemisphere emitter, and an opal glass window is disposed centrally on the bottom plate.

2. The high-diffusion-coefficient and high-brightness light source generation device according to claim 1, wherein a pattern in which the optical fiber bundle is arranged is provided such that geometric extending lines of all the optical fiber exit ends intersect at the hemisphere center of the optical fiber hemisphere emitter, and the center of the opal glass window is coincided with the hemisphere center.

3. The high-diffusion-coefficient and high-brightness light source generation device according to claim 1, wherein a number n of optical fibers in the optical fiber bundle meets the following formula:

$$n = \mathrm{trunk}\left(k\frac{M}{m}\sqrt{u}\right)$$

wherein trunk represents a round-off number, k represents a scaling factor, m represents the diameter of the optical fiber cores, M represents the diameter of the hemisphere, and u represents a spectrum attenuation coefficient of the optical fibers.

4. The high-diffusion-coefficient and high-brightness light source generation device according to claim 3, wherein the k is 14.5 dB$^{-2}$.

5. The high-diffusion-coefficient and high-brightness light source generation device according to claim 1, wherein the optical fiber bundle comprises 216 optical fibers, and the diameter of the optical fiber hemisphere emitter is 10.2 mm.

6. The high-diffusion-coefficient and high-brightness light source generation device according to claim 1, wherein the optical fibers in the optical fiber bundle are multimode optical fibers, and have the spectral characteristic within a range of not smaller than 380 nm-780 nm, the attenuation coefficient is smaller than 0.1 dB.

7. The high-diffusion-coefficient and high-brightness light source generation device according to claim 1, wherein the optical fiber hemisphere emitter and the bottom plate are formed of a rigid aluminum material.

8. The high-diffusion-coefficient and high-brightness light source generation device according to claim 7, wherein the inner wall of the optical fiber hemisphere emitter is a light reflecting surface which is sprayed and coated with a polyester vinyl fluoride layer, and has a spectral reflectivity of over 97% within a range of not smaller than 380 nm-780 nm.

9. The high-diffusion-coefficient and high-brightness light source generation device according to claim 1, wherein the incident end of the optical fiber bundle is secured in an aluminium sleeve, and an incident window of the optical fiber hemisphere emitter is formed on the end face of the incident end.

10. The high-diffusion-coefficient and high-brightness light source generation device according to claim 1, wherein a heat dissipation passage is formed on the bottom plate.

* * * * *